(12) United States Patent
Nakagawa

(10) Patent No.: US 10,185,462 B2
(45) Date of Patent: Jan. 22, 2019

(54) IMAGE PROCESSING APPARATUS AND METHOD

(75) Inventor: Maiko Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 490 days.

(21) Appl. No.: 13/982,589

(22) PCT Filed: Mar. 2, 2012

(86) PCT No.: PCT/JP2012/001428
§ 371 (c)(1),
(2), (4) Date: Jul. 30, 2013

(87) PCT Pub. No.: WO2012/120848
PCT Pub. Date: Sep. 13, 2012

(65) Prior Publication Data
US 2013/0311952 A1    Nov. 21, 2013

(30) Foreign Application Priority Data

Mar. 9, 2011 (JP) ................................. 2011-052085

(51) Int. Cl.
*G06F 3/0481* (2013.01)
*H04N 5/232* (2006.01)
(Continued)

(52) U.S. Cl.
CPC ........ *G06F 3/04815* (2013.01); *G06F 3/0488* (2013.01); *G06F 3/04817* (2013.01);
(Continued)

(58) Field of Classification Search
CPC . G06F 3/04815; G06F 3/0304; G06F 3/04817
See application file for complete search history.

(56) References Cited

U.S. PATENT DOCUMENTS 5,801,704 A * 9/1998 Oohara .................. G06F 3/011
345/157
6,191,773 B1 * 2/2001 Maruno .................. G06F 3/017
345/156

(Continued)

FOREIGN PATENT DOCUMENTS

| JP | 2005-316790 A | 11/2005 |
| JP | 2006-236143 A | 9/2006 |
| WO | WO 2011/013514 A1 | 2/2011 |

OTHER PUBLICATIONS

U.S. Appl. No. 13/984,095, filed Aug. 7, 2013, Nakagawa.
International Search Report dated May 22, 2012 in PCT/JP2012/001428.

*Primary Examiner* — William L Bashore
*Assistant Examiner* — Nathan K Shrewsbury
(74) *Attorney, Agent, or Firm* — Chip Law Group

(57) ABSTRACT

A control unit, method and computer program product cooperate to provide a controllable depth of display of at least a part of a graphical user interface. Moreover, the control unit includes a control circuit that controls a depth display of an icon, which may be a user-selectable icon, as part of the graphical user interface. The control circuit changes the depth of display of the icon when an object is detected as approaching the display. In this way, a user is provided with visual feedback when the user is interacting with the graphical user interface.

19 Claims, 14 Drawing Sheets

US 10,185,462 B2
Page 2

(51) Int. Cl.
*G06F 3/0488* (2013.01)
*H04N 13/183* (2018.01)
*H04N 13/31* (2018.01)

(52) U.S. Cl.
CPC ..... *H04N 5/23216* (2013.01); *H04N 5/23293* (2013.01); *H04N 13/183* (2018.05); *H04N 13/31* (2018.05); *G06F 2203/04101* (2013.01)

(56) References Cited

U.S. PATENT DOCUMENTS

| | | | | |
|---|---|---|---|---|
| 6,281,877 B1* | 8/2001 | Fisher | | G06F 3/04815 345/419 |
| 6,750,848 B1* | 6/2004 | Pryor | | G06F 3/017 345/168 |
| 6,880,132 B2* | 4/2005 | Uemura | | G06F 3/04815 707/E17.102 |
| 7,848,542 B2* | 12/2010 | Hildreth | | G06F 1/1686 348/208.1 |
| 7,979,574 B2* | 7/2011 | Gillo | | A63F 13/005 463/1 |
| 8,166,421 B2* | 4/2012 | Magal | | G06F 3/017 382/218 |
| 8,302,031 B1* | 10/2012 | Sang | | G06F 9/4443 715/782 |
| 8,589,822 B2* | 11/2013 | Bell | | G02B 27/2228 715/801 |
| 8,601,402 B1* | 12/2013 | Habboub | | G01S 13/953 715/782 |
| 8,677,287 B2* | 3/2014 | Shimotani | | G01C 21/3664 345/660 |
| 2004/0193413 A1* | 9/2004 | Wilson | | G06F 3/017 704/243 |
| 2006/0139322 A1* | 6/2006 | Marks | | G06F 3/0304 345/156 |
| 2008/0040692 A1* | 2/2008 | Sunday | | G06F 3/04883 715/863 |
| 2008/0168403 A1* | 7/2008 | Westerman | | G06F 3/04883 715/863 |
| 2008/0174570 A1* | 7/2008 | Jobs | | G06F 3/0488 345/173 |
| 2008/0225007 A1* | 9/2008 | Nakadaira | | G06F 3/04815 345/173 |
| 2008/0246759 A1* | 10/2008 | Summers | | G06F 3/0304 345/420 |
| 2009/0005961 A1* | 1/2009 | Grabowski | | G01C 21/365 701/532 |
| 2009/0058829 A1* | 3/2009 | Kim | | G06F 3/016 345/173 |
| 2009/0203440 A1* | 8/2009 | Ohba | | A63F 13/00 463/32 |
| 2009/0313584 A1* | 12/2009 | Kerr | | G06F 3/012 715/849 |
| 2010/0115471 A1* | 5/2010 | Louch | | G06F 3/04817 715/849 |
| 2010/0138785 A1* | 6/2010 | Uoi | | G06F 3/017 715/810 |
| 2010/0199221 A1* | 8/2010 | Yeung | | G06F 3/017 715/850 |
| 2010/0302144 A1* | 12/2010 | Burtner | | G06F 3/0416 345/157 |
| 2010/0306716 A1* | 12/2010 | Perez | | A63F 13/10 715/863 |
| 2011/0007035 A1* | 1/2011 | Shai | | G06F 3/014 345/179 |
| 2011/0041098 A1* | 2/2011 | Kajiya | | G06F 3/04815 715/849 |
| 2011/0047512 A1* | 2/2011 | Onogi | | G06F 3/0482 715/836 |
| 2011/0069019 A1* | 3/2011 | Carpendale | | G06F 3/0425 345/173 |
| 2011/0083106 A1* | 4/2011 | Hamagishi | | G06F 3/017 715/836 |
| 2011/0093778 A1* | 4/2011 | Kim | | G06F 3/041 715/702 |
| 2011/0096033 A1* | 4/2011 | Ko | | G06F 3/017 345/175 |
| 2011/0106439 A1* | 5/2011 | Huang | | G01C 21/3682 701/532 |
| 2011/0119629 A1* | 5/2011 | Huotari | | G06F 21/36 715/836 |
| 2011/0141009 A1* | 6/2011 | Izumi | | A63F 13/04 345/156 |
| 2011/0234639 A1* | 9/2011 | Shimotani | | G01C 21/3664 345/661 |
| 2011/0260965 A1* | 10/2011 | Kim | | G06F 3/013 345/156 |
| 2011/0281619 A1* | 11/2011 | Cho | | G06F 3/0488 455/566 |
| 2012/0092251 A1 | 4/2012 | Hashimoto et al. | | |
| 2012/0117514 A1* | 5/2012 | Kim | | G06F 3/011 715/849 |
| 2012/0192067 A1* | 7/2012 | DeLuca | | G06F 1/1637 715/702 |
| 2013/0181982 A1* | 7/2013 | Tasaki | | B60K 35/00 345/419 |
| 2013/0345980 A1* | 12/2013 | van Os | | G01C 21/3626 701/538 |
| 2014/0089859 A1* | 3/2014 | Ishizaka | | G06F 3/044 715/836 |
| 2014/0325455 A1* | 10/2014 | Tobin | | G06F 3/04815 715/850 |
| 2015/0020031 A1* | 1/2015 | El Dokor | | G06F 3/011 715/849 |
| 2015/0121287 A1* | 4/2015 | Fermon | | G06F 3/016 715/773 |

\* cited by examiner

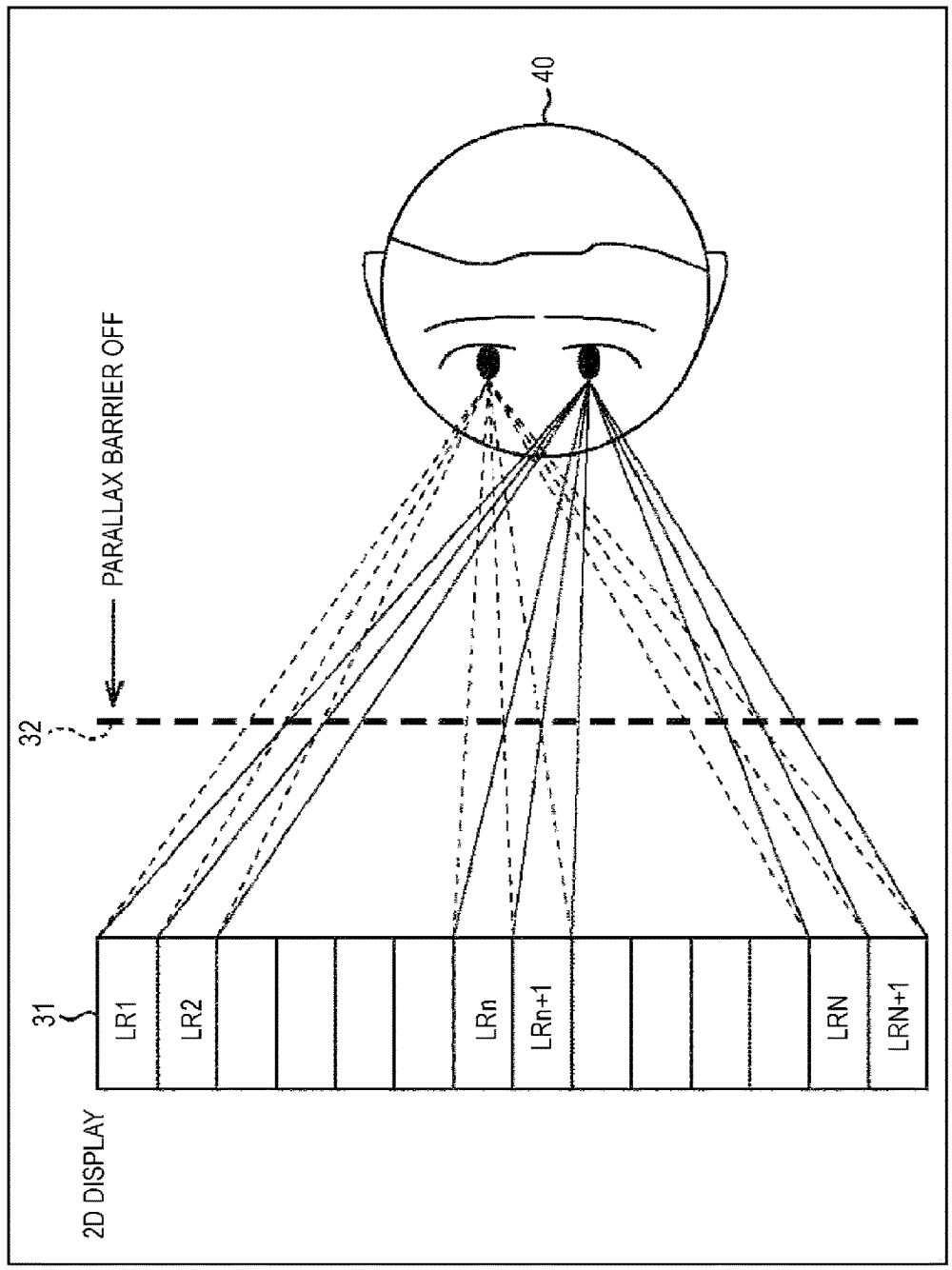

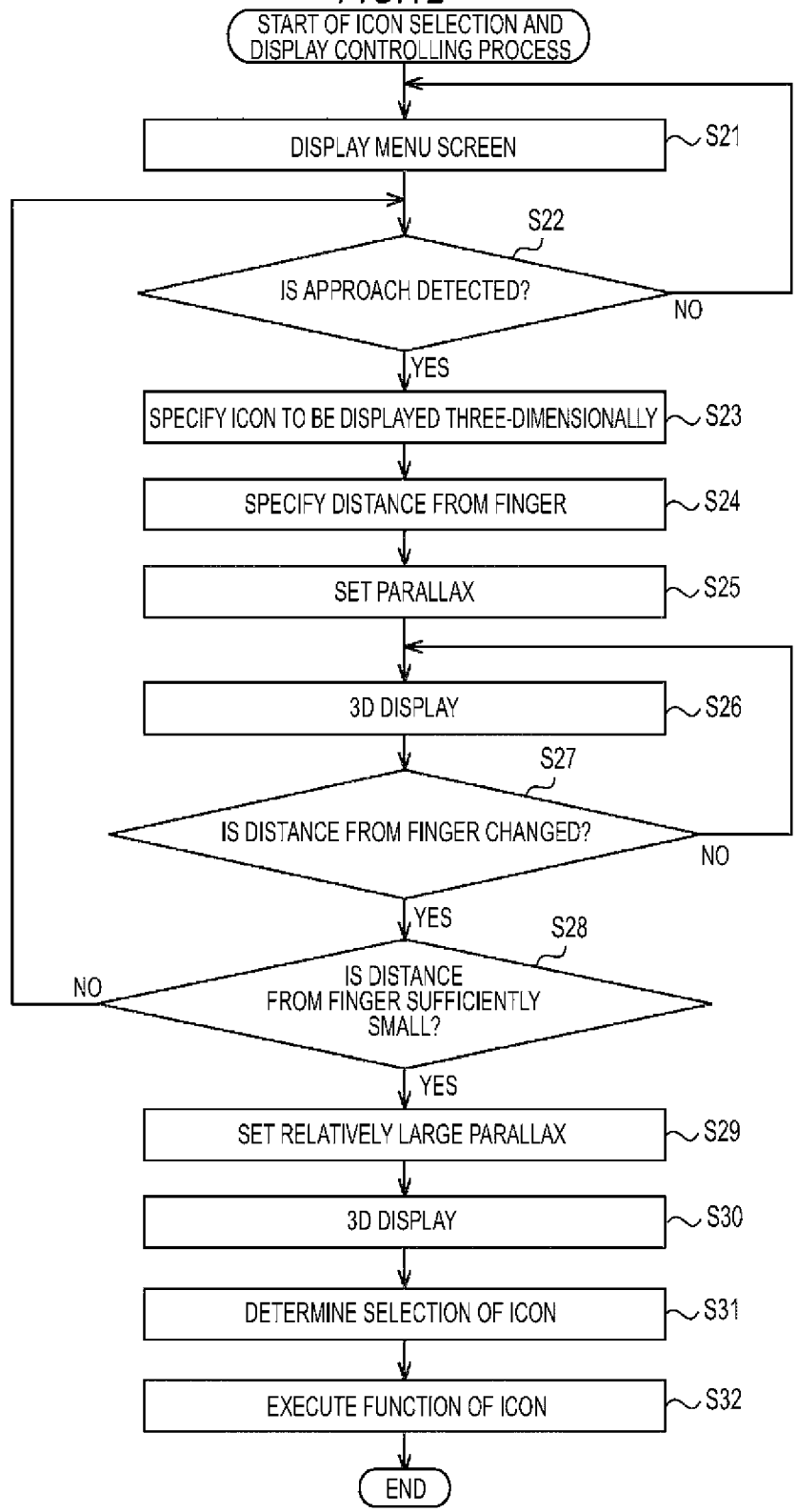

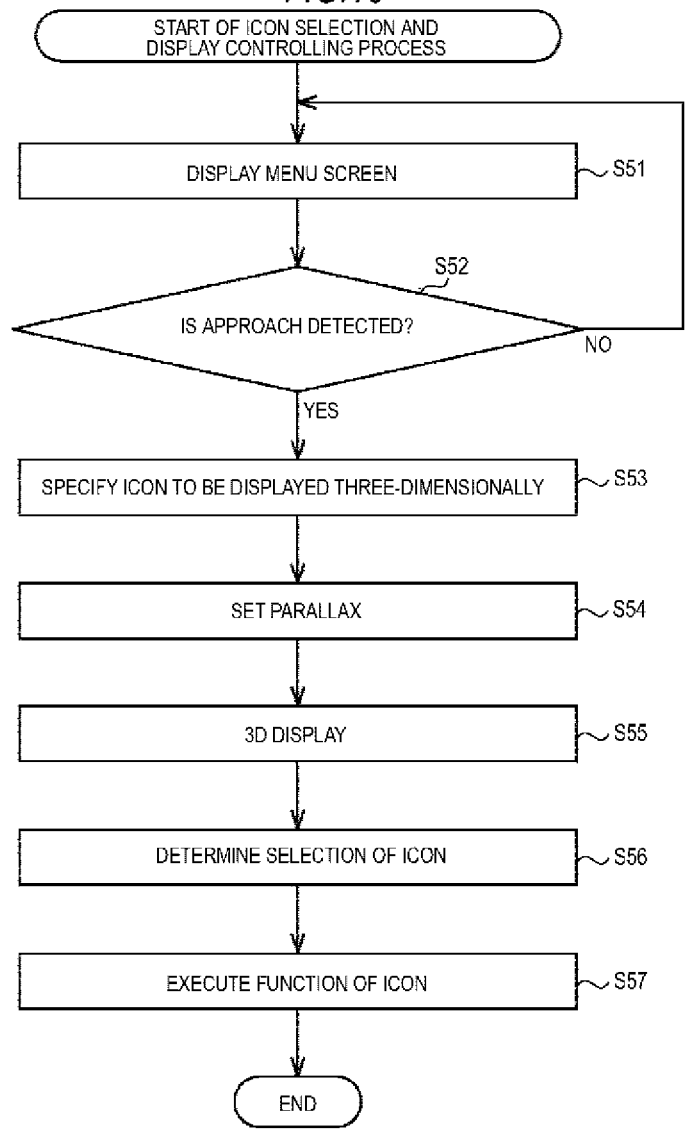

IMAGE PROCESSING APPARATUS AND METHOD

TECHNICAL FIELD

The present disclosure relates to an image processing apparatus, and method, and computer program product, and more particularly, to image processing apparatus and method, and a computer program product, which can allow a function allocated to an icon or the like to be selected and executed without touching a display screen.

BACKGROUND ART

The expansion of a GUI (Graphical User Interface) function has been attempted from the related art.

For example, as a GUI that adopts an icon, a GUI that is displayed on a touchscreen which is collectively constructed by a display panel such as a liquid crystal panel that displays an icon or the like, and a touch panel that detects a touching by a user's finger.

In the GUI using the touchscreen, when the icon displayed on the touchscreen is touched, a function that is allocated to the icon is executed.

In addition, a technology in which the approach of a finger to a display screen is detected, and the icon is enlarged and displayed is also suggested (for example, refer to PTL1 and PTL2).

CITATION LIST

Patent Literature

PTL 1: JP-A-2006-236143
PTL 2: JP-A-2005-51876

SUMMARY OF INVENTION

Technical Problem

However, in PTL1 and PTL2, to select and execute a function allocated to an icon, it is necessary to touch the display screen on which the icon is displayed.

As described above, when the display screen such as a liquid crystal panel is touched by a finger, a contaminant such as sebum may be attached thereto. In addition, when the display screen is strongly pressed plural times, the liquid crystal panel or the like may be damaged.

On the other hand, in a case where the function allocated to the icon is allowed to be executed without touching the display screen, for example, there is a problem in that it is difficult to return feedback to a user, through which the user clearly comes to feel the selection of the icon, or the like.

Under the circumstance, it is desirable to allow a function allocated to an icon or the like to be selected and executed without touching a display screen.

Solution to Problem

According to one embodiment, a control unit includes a control circuit that controls a depth display of a part of a graphical user interface displayed on a display, the control circuit changes the depth of display of the part when an object is detected as approaching the display.

According to an aspect of the embodiment,
the control unit changes the depth of display by lessening the depth of display.

According to another aspect of the embodiment, the part is an icon displayed on the display.

According to another aspect of the embodiment,
the icon is a user-selectable icon and the control circuit changes the depth of display in response to the object being detected as being within a predetermined distance from the icon.

According to another aspect of the embodiment,
the control circuit changes the icon from a first state to a second state when the object is detected as being within a predetermined distance of the display, the second state causing the icon to be perceived visually at a different distance than for the first state.

According to another aspect of the embodiment, the unit further includes
a sensor that detects when the object is a predetermined distance from the display.

According to another aspect of the embodiment,
the sensor is an electrostatic capacitance sensor that is included as an integral part of the display.

According to another aspect of the embodiment, the unit further includes
the display, the display being a 3-dimensional display.

According to another aspect of the embodiment,
the 3-dimensional display includes a left image and a right image.

According to another aspect of the embodiment,
the control circuit changes a parallax of the part so as to create a visually perceptual change in display depth of the part.

According to another aspect of the embodiment,
the part of the graphical user interface is an icon, and the control circuit
changes the depth of display of the part when the object is a first distance from the display, and
executes a function associated with the icon when the object is detect as being within a second distance from the display, the second distance being less than the first distance.

According to another aspect of the embodiment,
the control circuit changes a color of the icon when the object is within the second distance of the display.

According to another aspect of the embodiment,
the control circuit causes the icon to gradually disappear in response to the object being detected as being within the second distance and triggering an execution of the function.

According to a method embodiment, the method includes
displaying a part of a graphical user interface on a display;
detecting an object approach the display;
controlling with a control circuit a depth display of the part of a graphical user interface, the controlling includes changing the depth of display of the part.

According to an aspect of the method,
the controlling includes changing the depth of display by lessening the depth of display.

According to an aspect of the method,
the part is an icon displayed on the display.

According to an aspect of the method,
the icon is a user-selectable icon, and
the controlling changes the depth of display in response to the object being detected as being within a predetermined distance from the icon.

According to an aspect of the method,
the controlling includes changing the icon from a first state to a second state when the object is detected as being within a predetermined distance of the display, the second state causing the icon to be perceived visually at a different distance than for the first state.

According to an aspect of the method, the method further includes detecting with a sensor when the object is a predetermined distance from the display.

According to a non-transitory computer readable storage device embodiment, the storage device has computer readable instructions that when executed by a processing circuit implement a display control method, the method includes displaying a part of a graphical user interface on a display;

detecting an object approach the display;

controlling with a control circuit a depth display of the part of a graphical user interface, the controlling includes changing the depth of display of the part.

Advantageous Effects of Invention

According to the embodiments of the present disclosure, it is possible to allow a function allocated to an icon or the like to be selected and executed without touching a display screen.

BRIEF DESCRIPTION OF DRAWINGS

FIG. 3 is a diagram illustrating an example in a case where an image is displayed with a parallax barrier turned on.

FIG. 4 is a diagram illustrating an example in a case where an image is displayed with the parallax barrier turned off.

FIG. 12 is a diagram illustrating an example of an icon selection and display controlling process.

FIG. 13 is a diagram illustrating another example of the icon selection and display controlling process.

DESCRIPTION OF EMBODIMENTS

Hereinafter, an embodiment of the present disclosure will be described with reference to the attached drawings.

In an embodiment described below, a 3D image (an image that is displayed in a three-dimension) is displayed. Therefore, before describing an embodiment of the present disclosure, an outline of a method of generating the 3D image including a left eye image and a right eye image for ease of comprehension of an embodiment of the present disclosure will be provided.

Figure 1:
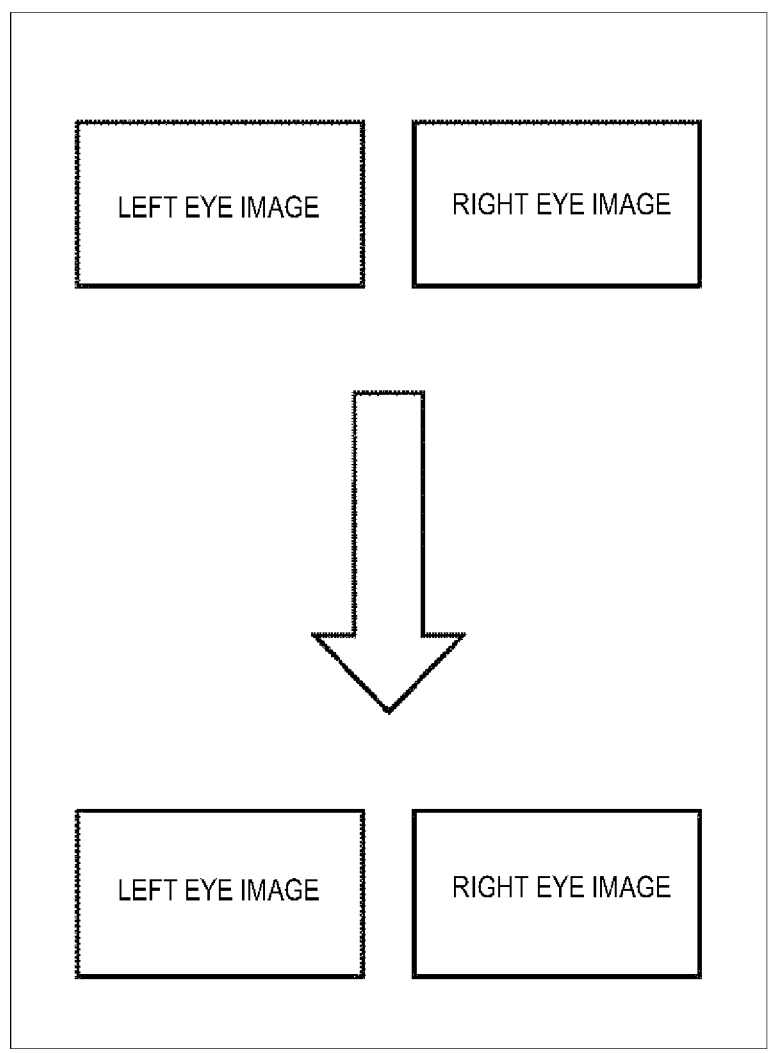
FIG. 1 is a diagram illustrating a method of generating a 3D image.

FIG. 1 shows a diagram illustrating a method of generating the 3D image.

A first generation method is a method using an imaging apparatus in which two lenses are provided. That is, in the first generation method, a user maintains the imaging apparatus in such a manner that the two lenses are disposed in an approximately horizontal direction, and takes a picture one time. Then, in the two lenses, data of a left eye image is generated by light that transmits through a left side lens and data of a right eye image is generated by light that transmits through a right side lens.

In addition, the left eye image data and the right eye image data may be generated corresponding to an image generated by CG (Computer Graphics) without using an imaging apparatus or the like.

Each of the left eye image and the right eye image generated in this way includes a corresponding object at a position spaced in correspondence with the distance between two lenses of the imaging apparatus. Here, the difference (that is, the distance) between an arranged position in a substantially horizontal direction of the corresponding object included in each of the left eye image and the right eye image is referred to as the parallax. The larger the parallax is, the deeper the depth of the object that is displayed three-dimensionally becomes. That is, the degree of unevenness becomes stronger. Therefore, parallax having the above-described characteristics may be used as a parameter that determines the degree of unevenness of the object displayed three-dimensionally.

Figure 2:
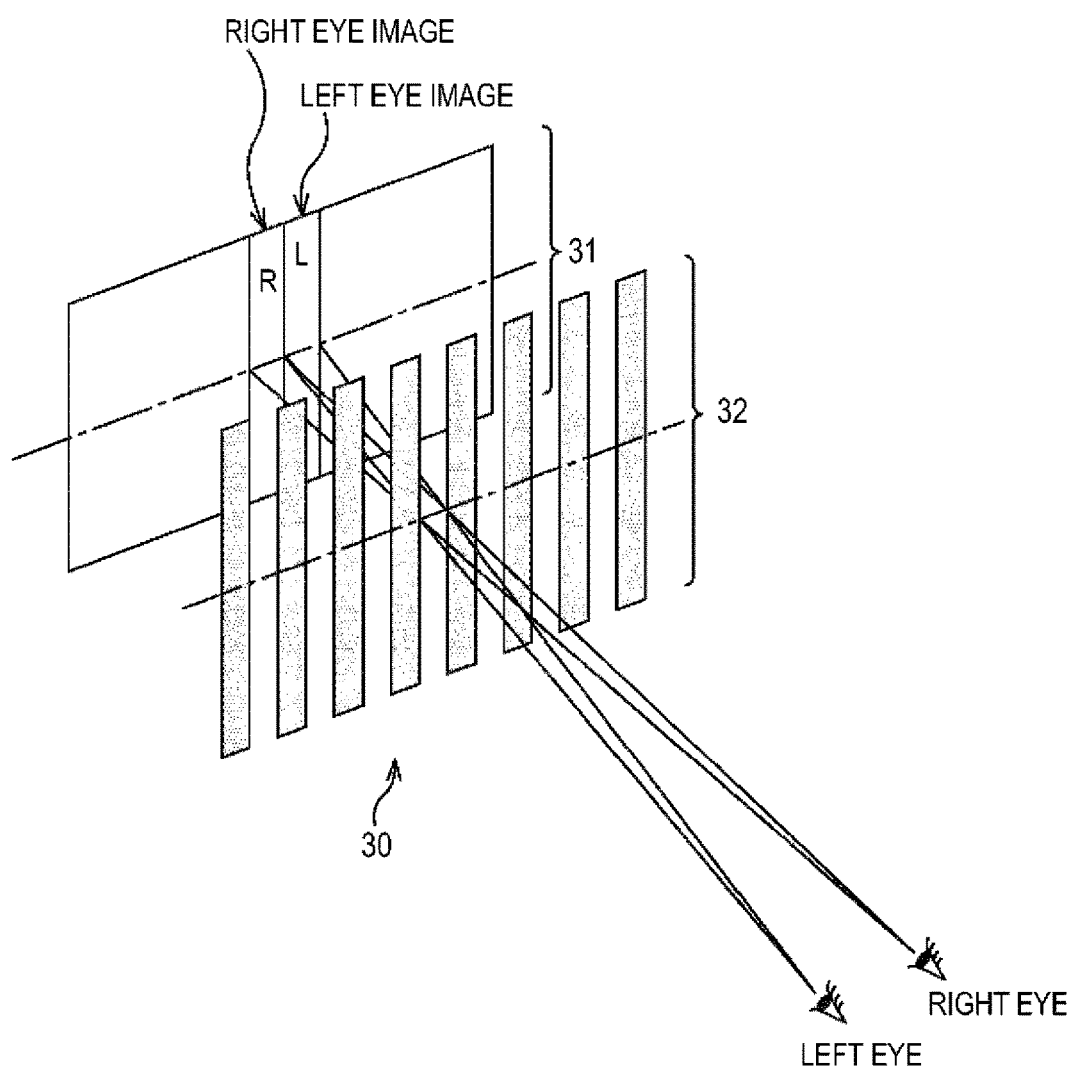
FIG. 2 is a diagram illustrating a configuration example of a display that displays the 3D image.

FIG. 2 shows a diagram illustrating a configuration example of a display that displays the above-described 3D image. The display shown in the same drawing is a 3D display 30 that displays a 3D image with a system called a parallax barrier system, and allows a user to sense the unevenness of the object displayed three-dimensionally through an observation of the 3D display 30 with the naked eye.

As shown in FIG. 2, the 3D display 30 includes a display layer 31 and a parallax barrier layer 32. In the display layer 31, the left eye image and the right eye image are displayed alternately for each unit pixel (one column) in the horizontal direction. In the same drawing, a column of the display layer 31 in which the left eye image is displayed is indicated by "L", and a column "R" in which the right eye image is displayed, is indicated by "R".

The parallax barrier layer 32 is formed of a lattice-type barrier having the same periodic column as that of the image on the display layer 31, and the width of an opening portion of the barrier is set to have the same width as that of one image column of the display layer 31. When a user views the image displayed on the display layer 31 from a position spaced with a predetermined distance through the parallax barrier layer 32, "L" and "R" images are separately presented to the left and right eyes of the user and therefore parallax occurs.

Figure 3:
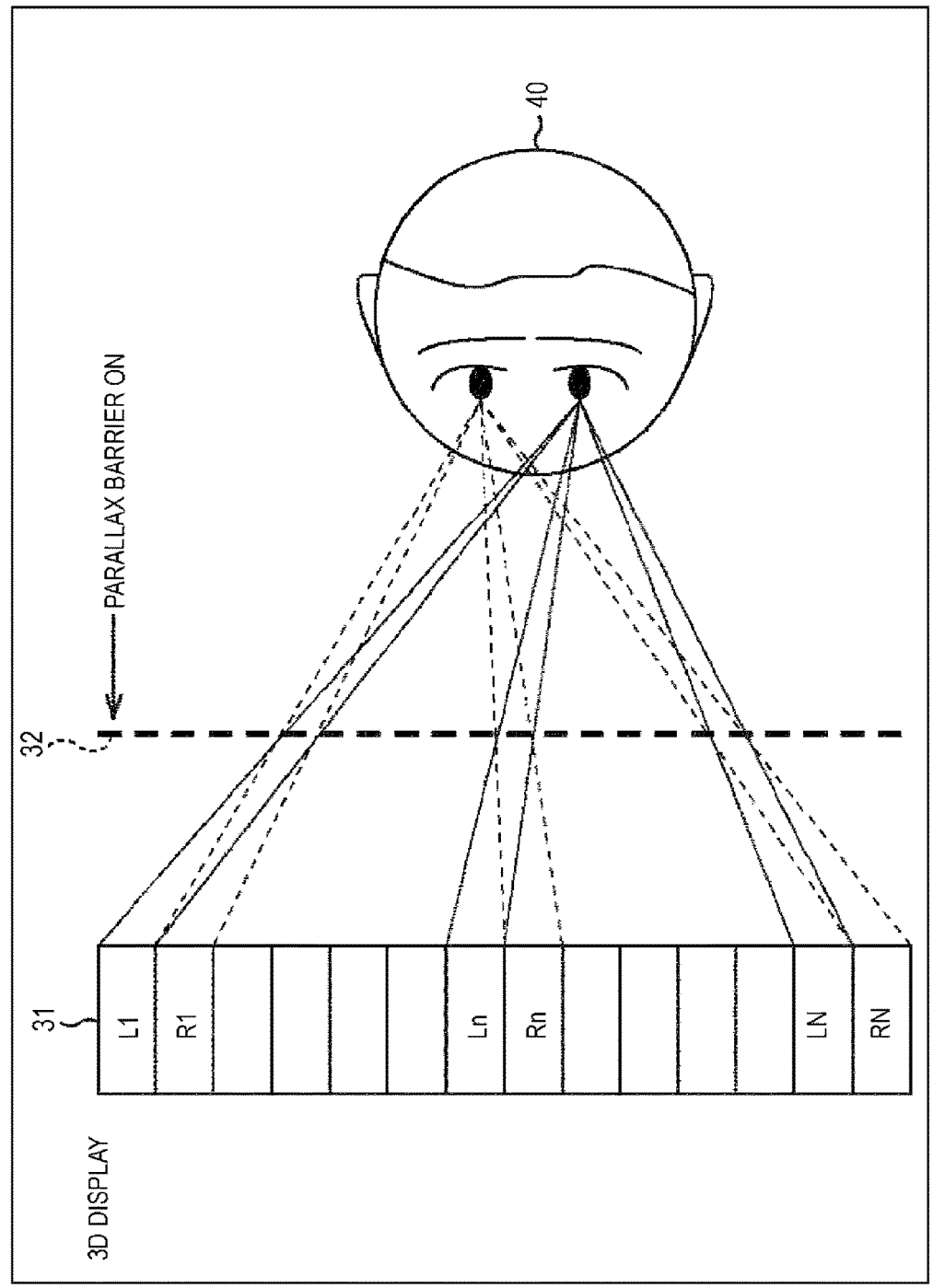

For example, as shown in FIG. 3, when a user 40 views an image displayed on the display layer 31 from a position spaced with a predetermined distance through the parallax barrier layer 32, an image composed of columns of a left eye image is presented to a left eye of the user 40, and an image composed of columns of a right eye image is presented to a right eye of the user 40. In an example of the same drawing, an image composed of each column of "L1 (represents a first left eye image)", . . . , "Ln (represents an n-th left eye image)", . . . , "LN (represents a N-th left eye image)" is presented to the left eye of the user 40. In addition, an image composed of each column of "R1 (represents a first right eye image)", . . . , "Rn (represents a n-th right eye image)", . . . , "RN (represents a N-th right eye image)" is presented to the right eye of the user 40.

In this way, it is possible to allow the user 40 to sense the unevenness of the object that is displayed three-dimensionally by observing the 3D display 30 with the naked eye. In addition, the image observed through the parallax barrier layer 32 can represent a half of the resolution which the display layer 31 originally has in the horizontal direction. Therefore, the 3D display 30 can display an image with the parallax barrier turned on as shown in FIG. 3, and can display the image with the parallax barrier turned off as shown in FIG. 4.

FIG. 4 shows a diagram illustrating an example where the image is displayed with the parallax barrier turned off. In the case of the example in FIG. 4, an image displayed in each column of the display layer 31 is presented to the left eye and the right eye of the user 40, respectively. Therefore, in a case where the image is displayed with the parallax barrier turned off, images "LR1", "LR2", . . . , which are presented to both the left and right eyes, are displayed in each column of the display layer 31, and therefore the image can be displayed with the resolution which the display layer 31 originally has in the horizontal direction. However, in the case of FIG. 4, since the image having parallax is not presented to the user, it is difficult to display the image three-dimensionally and only two-dimensional display (2D display) may be performed.

In this way, the 3D display 30 is configured to 3D-display an image as shown in FIG. 3, or 2D-display an image as shown in FIG. 4.

Figure 5A:
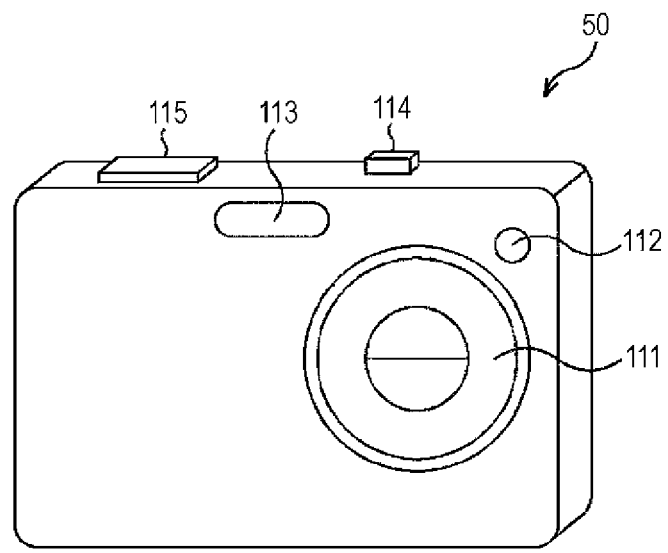
FIGS. 5A and 5B are diagrams illustrating an appearance configuration example of an imaging apparatus as an embodiment of an image processing apparatus to which a technology of the present disclosure is applied.
Figure 5B:
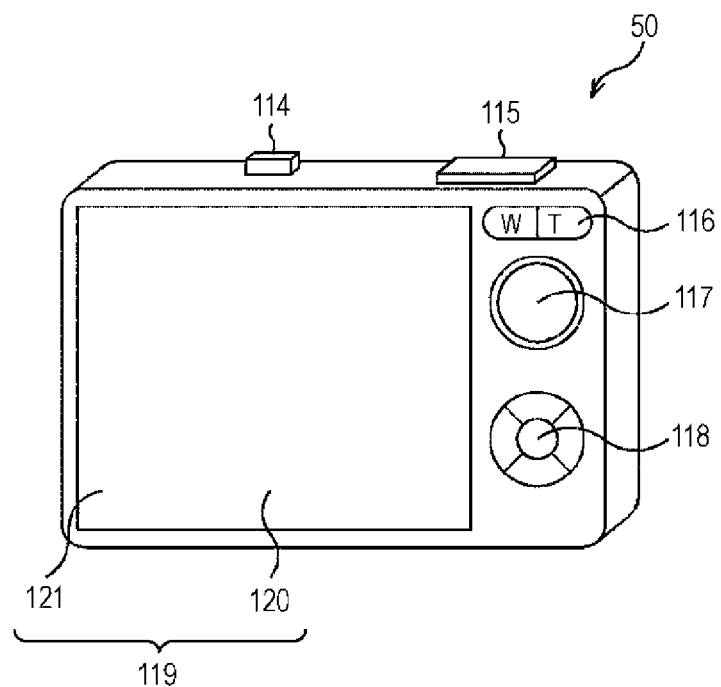

FIGS. 5A and 5B show diagrams illustrating an appearance configuration example of an imaging apparatus 50 as an embodiment of an image processing apparatus to which a technology of the present disclosure is applied.

FIG. 5A shows the front face of the imaging apparatus 50 and FIG. 5B shows the rear face thereof, respectively.

As shown in FIG. 5A, for example, at the right side of the front face of the imaging apparatus 50 configured as a digital camera, a lens unit 111 is provided. The lens unit 111 includes an optical system such as a condensing lens that condenses light transmitted from a subject, a focus lens that adjusts a focus, and an aperture, and the others (all not shown). The lens unit 111 protrudes from a casing of the imaging apparatus 50 when a power of the imaging apparatus 50 is turned on, and is accommodated in the casing of the imaging apparatus 50 when the power is turned off. In FIG. 5A, the lens unit 111 is accommodated in the casing of the imaging apparatus 50.

At the upper-right side of the lens unit 111 at the front face of the imaging apparatus 50, an AF (auto focus) auxiliary light transmitting unit 112 is provided. The AF auxiliary light transmitting unit 112 emits light as AF auxiliary light in an optical axis direction of an optical system of the lens unit 111 and thereby illuminates a subject. In this manner, for example, a so-called auto focus function operates, in which even in a dark place, an image of the subject is captured, and the subject is brought into focus based on the image.

At the upper-middle side of the front face of the imaging apparatus 50, a strobe 113 is disposed.

At the right side of the top face of the imaging apparatus 50 when seen from the front face side, a power button 114 that is operated when turning on and off the power is provided, and at the left side thereof when seen from the front face side, a shutter button (release button) 115 that is operated when recording an image that is captured.

As shown in FIG. 5B, at the upper-right side of the rear face of the imaging apparatus 50, a zoom button 116 is provided.

For example, when a user captures an image of the subject by using the imaging apparatus 50, when making an instruction of a telephoto (Tele), the user presses a portion (hereinafter, referred to as a T button) marked by "T" in the zoom button 116. On the other hand, when making an instruction of a wide angle (Wide), the user presses a portion (hereinafter, referred to as a W button) marked by "W" in the zoom button 116. In addition, the user may make an instruction of the telephoto (Tele) or the wide angle (Wide) in succession by maintaining a pressed state of the T button or W button.

At a lower side of the zoom button 116, a mode dial 117 is provided. This mode dial 117 is operated when various modes of the imaging apparatus 50 are selected, or the like. As an operation mode of the imaging apparatus 50, for example, a photographing mode at which a subject is photographed, or an image display mode at which a photographed image obtained as a result of the photographing of the subject is displayed may be exemplified. In addition, as a mode related to various operations at the photographing mode, a mode where the lighting of the strobe 113 is forcibly turned on or off, a mode where a self-timer is used, a mode where a menu screen is displayed on a liquid crystal panel 120 described later, or the like may be exemplified.

At a lower side of the mode dial 117, an operation button 118 is provided. This operation button 118 is used when the user performs an instruction operation allocated in advance.

For example, the user operates the operation button 118 and thereby moves a cursor on the menu screen, and as a result thereof can select an item present in an arranged position of the cursor.

A touchscreen 119 includes the liquid crystal panel 120 and an approach panel 121 disposed on the liquid crystal panel 120, which are integrally formed. The touchscreen 119 displays various images by the liquid crystal panel 120 and receives an operation of the user by the approach panel 121.

The liquid crystal panel 120 is configured, for example, as a display having the same configuration as that of the 3D display 30 described above with reference FIGS. 2 to 4, and is configured to display an image two-dimensionally or three-dimensionally as necessary.

The approach panel 121 detects a variance in an electrostatic capacitance through the same method as a touchscreen of an electrostatic capacitance method and thereby detects that the user's finger or the like approaches thereto. The approach panel 121 detects a variance in an electrostatic capacitance at a predetermined position on a panel and outputs a signal indicating how much the user's finger or the like approaches at that position.

Figure 6:
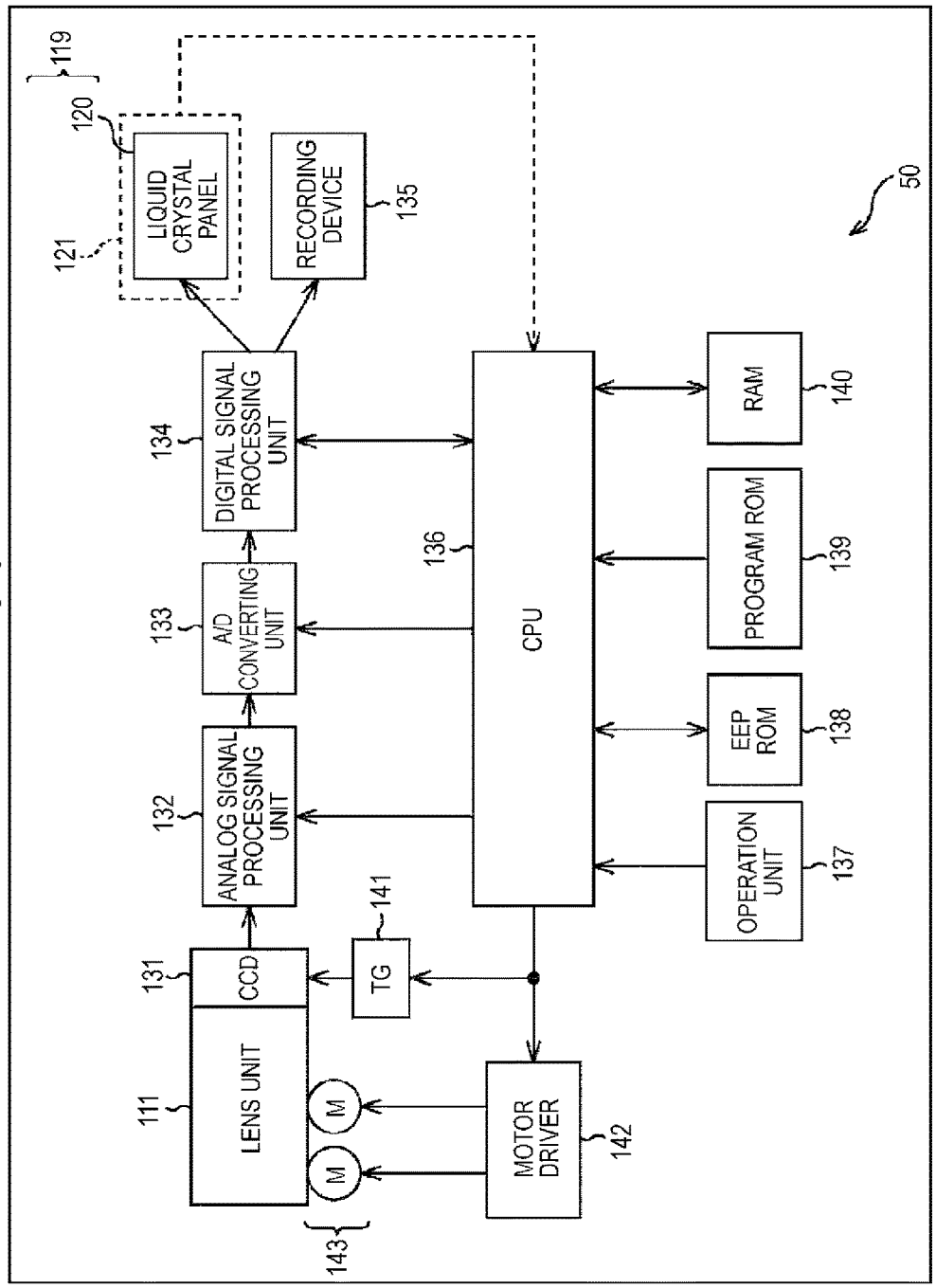
FIG. 6 is a block diagram illustrating an internal configuration example of the imaging apparatus in FIGS. 5A and 5B.

FIG. 6 shows a block diagram illustrating an internal configuration of the imaging apparatus 50 in FIGS. 5A and 5B.

In addition, in FIG. 6, the AF auxiliary light transmitting unit 112 and the strobe 113 in FIGS. 5A and 5B are not drawn.

A CCD (charge coupled device) 131 operates according to a timing signal supplied from a timing generator (TG) 141. The CCD 131 receives light from a subject, which is incident through the lens unit 111 and performs a photo-electric conversion, and supplies an analog image signal as an electric signal, which corresponds to the amount of light received, to an analog signal processing unit 132.

The analog signal processing unit 132 performs an analog signal processing such as an amplification of an analog image signal supplied from the CCD 131, or the like, according to a control of a CPU (Central Processing Unit) 136, and supplies the image signal, which is obtained as a result of the analog signal processing, to an A/D (analog/digital) converting unit 133.

The A/D converting unit 133 A/D-converts an image signal, which is an analog signal supplied from the analog signal processing unit 132, according to a control of the CPU 136, and supplies the image data, which is a digital signal obtained as a result of the conversion, to a digital signal processing unit 134.

According to a control of the CPU 136, the digital signal processing unit 134 performs a digital signal processing such as the removal of noise with respect to the image data supplied from the A/D converting unit 133, and the image data after the processing to the liquid crystal panel 120. In this manner, on the liquid crystal panel 120, an image corresponding to data of the supplied image, that is, a photographed image (hereinafter, referred to as a through-the-lens image) while being photographed is displayed. In addition, the digital signal processing unit 134 compresses and encodes the image data supplied from the A/D converting unit 133 through, for example, a JPEG (joint photographic experts group) method or the like, and supplies the compressed and encoded data obtained as a result thereof to a recording device 135 to be recorded therein. In addition, the digital signal processing unit 134 decompresses and decodes the compressed and encoded data that is recorded in the recording device 135 and supplies the image data obtained as a result thereof to the liquid crystal panel 120. In this manner, on the liquid crystal panel 120, an image that corresponds to data of the supplied image, that is, a recorded photographed image is displayed.

In addition, the digital signal processing unit 134 controls a display of a GUI (for example, a menu screen described later) that is displayed on the liquid crystal panel 120 according to a control of the CPU 136.

The recording device 135 includes, for example, a disc such as a DVD (Digital Versatile Disc), a semiconductor memory such as a memory card, and other removable recording medium, and is provided to be easily detached from the imaging apparatus 50. In the recording device 135, data of the photographed image is recorded.

The CPU 136 executes a program that is recorded in a program ROM (Read Only Memory) 139, and controls each unit making up the imaging apparatus 50, and performs various processes according to a signal supplied from the approach panel 121 or a signal supplied from an operation unit 137.

The operation unit 137 is operated by a user and supplies a signal corresponding to the operation to the CPU 136. In addition, the operation unit 137 includes the power button 114, the shutter button 115, the zoom button 116, the mode dial 117, the operation button 118, or the like shown in FIGS. 5A and 5B.

An EEPROM (Electrically Erasable Programmable ROM) 138 stores data or the like that is necessary to be maintained even when the power of the imaging apparatus 50 is turned off, in addition to various kinds of information set to the imaging apparatus 50, according to the control of the CPU 136.

The program ROM 139 stores a program, which is executed by the CPU 136, and data necessary in order for the CPU 136 to execute a program. A RAM (Random Access Memory) 140 temporarily stores a program or data, which is necessary in order for the CPU 136 to perform various processes.

The timing generator 141 supplies a timing signal to the CCD 131 according to a control of the CPU 136. A exposure time (shutter speed) in the CCD 131, or the like is controlled by the timing signal supplied from the timing generator 141 to the CCD 131.

A motor driver 142 drives an actuator 143 including a motor according to a control of the CPU 136. When the actuator 143 is driven, the lens unit 111 protrudes from the casing of the imaging apparatus 50 or is accommodated in the casing of the imaging apparatus 50. In addition, when the actuator 143 is driven, an adjustment of the aperture making up the lens unit 111, or a movement of the focus lens making up the lens unit 111 is performed.

In the imaging apparatus 50 configured as described above, the CCD 131 receives light from a subject, which is incident through the lens unit 111, and performs a photo-electric conversion, and outputs an analog image signal obtained as a result of the conversion. The analog image signal output from the CCD 131 is made into image data of a digital signal when being passed through the analog signal processing unit 132 and the A/D converting unit 133, and is supplied to the digital signal processing unit 134.

The digital signal processing unit 134 supplies image data supplied from the A/D converting unit 133 to the liquid crystal panel 120, and as a result thereof, on the liquid crystal panel 120, a through-the-lens image is displayed.

When a user operates the shutter button 115 (FIGS. 5A and 5B), a signal corresponding to the operation is supplied from the operation unit 137 to the CPU 136. When the signal corresponding to the operation of the shutter button 115 is supplied from the operation unit 137, the CPU 136 controls the digital signal processing unit 134 to compress the image data supplied from the A/D converting unit 133 to the digital signal processing unit 134, and to record the compressed image data obtained as a result of the compression in the recording device 135.

In this manner, so-called photographing is performed.

In addition, the CPU 136 executes a predetermined program and thereby generates image data of a 3D image.

In the case of generating the 3D image, the CPU 136 sets parallax d. In a case where the parallax d is set to have a large value, a sense of perspective (degree of unevenness of an object that is displayed three-dimensionally) of an object displayed with an image having parallax becomes large. For example, in a case where the parallax d is set to have a large value, at the side of the user who observes a screen, it looks as if the object protrudes forward greatly from the screen (or as if the screen is drawn in deeply).

On the other hand, when the parallax d is set to have a small value, a sense of perspective (degree of unevenness of an object that is displayed three-dimensionally) of an object displayed with an image having parallax becomes small. For example, in a case where the parallax d is set to have a small value, at the side of the user who observes a screen, it looks as if the object is present to be substantially flush with the screen.

The CPU 136 acquires image data that becomes an origin of the generation of the 3D image, sets a region to be processed, in which an object to be displayed three-dimensionally is displayed, and sets a reference point P at a predetermined position of the region to be processed in the horizontal direction. The CPU 136 generates respective data of left and right regions that are spaced from the reference point P with the same distance determined in correspondence with the parallax d as left eye image data and right eye image data.

Images corresponding to the left eye image data and the right eye image data, which are generated in this manner and have the parallax d, are displayed on the touchscreen 119, and therefore the user is able to observe the 3D image.

Figure 7:
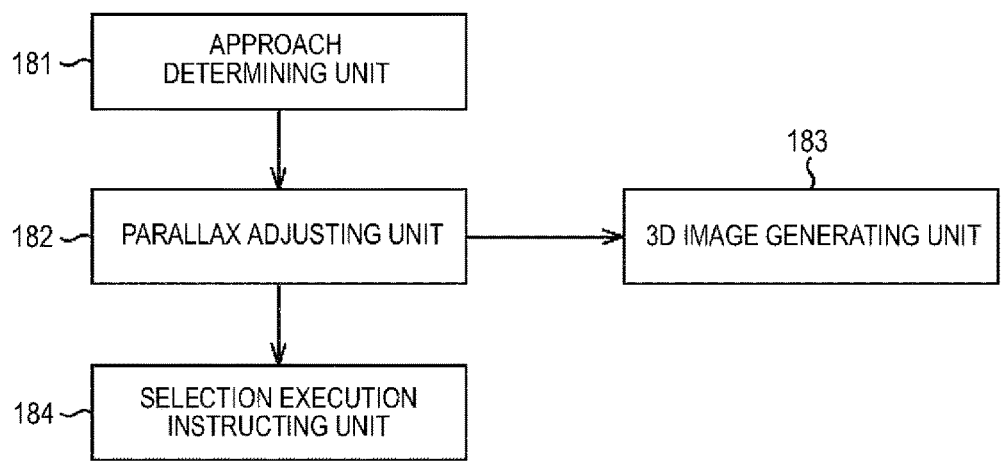
FIG. 7 is a block diagram illustrating a functional configuration example of software executed by a CPU.

FIG. 7 shows a block diagram illustrating a functional configuration example of software of a program or the like that is executed by the CPU 136.

An approach determining unit 181 determines a degree of approach of the user's finger or the like with respect to the touchscreen 119, based on an approach detection signal output from an approach panel 121. For example, when the user's finger or the like approaches to the touchscreen 119 until a distance from the touchscreen 119 becomes less than a predetermined threshold value, the approach determining unit 181 generates and outputs predetermined data indicating this situation. In addition, when the user's finger or the like, which approached to the touchscreen 119, goes away from the touchscreen 119 until a distance from the screen 119 becomes equal to or larger than a predetermined threshold value, the approach determining unit 181 generates and outputs data indicating this situation. In addition, in the data generated by the approach determining unit 181, information indicating whether the user's finger or the like approaches to a portion of the touchscreen 119 (the approach panel 121) or the like is included.

A parallax adjusting unit 182 sets parallax of the 3D image generated by a 3D image generating unit 183. For example, the degree of approach of the user's finger or the like is specified based on data output from the approach determining unit 181 and the parallax of the 3D image is set based on this degree of approach. For example, in a case where it is specified that the user's finger approaches to a distance less than a first threshold value, parallax d1 is set, and in a case where it is specified that the user's finger approaches to a distance less than a second threshold value smaller than the first threshold value, parallax d2 larger than the parallax d1 is set.

In addition, the parallax adjusting unit 182 acquires data of an image (for example, an image of a menu screen described later) that becomes an origin of the generation of the 3D image, and specifies a region to be processed in which an object to be displayed three-dimensionally is displayed. At this time, for example, an object to be displayed three-dimensionally (for example, an icon that is displayed on a menu screen described below) is specified, based on information that is included in data output from the approach determining unit 181 and indicates whether the user's finger or the like approaches to which portion of the touchscreen 119. In addition, the parallax adjusting unit 182 sets a reference point P, for example, at a central position of an object to be displayed three-dimensionally.

The 3D image generating unit 183 generates respective data of left and right regions that are spaced from the above-described reference point with the same distance determined in correspondence with the parallax as left eye image data and right eye image data. In this manner, data of the 3D image is generated.

When the degree of approach between the object to be displayed three-dimensionally and the user's finger or the like is specified based on data output from the approach determining unit 181, a selection execution instructing unit 184 determines that the object is selected based on this degree of approach, and gives an instruction for the execution of a function corresponding to the object. For example, it is determined that a predetermined icon displayed on a menu screen described below is selected, and an instruction is given for an execution of a function corresponding to the icon.

Figure 8:
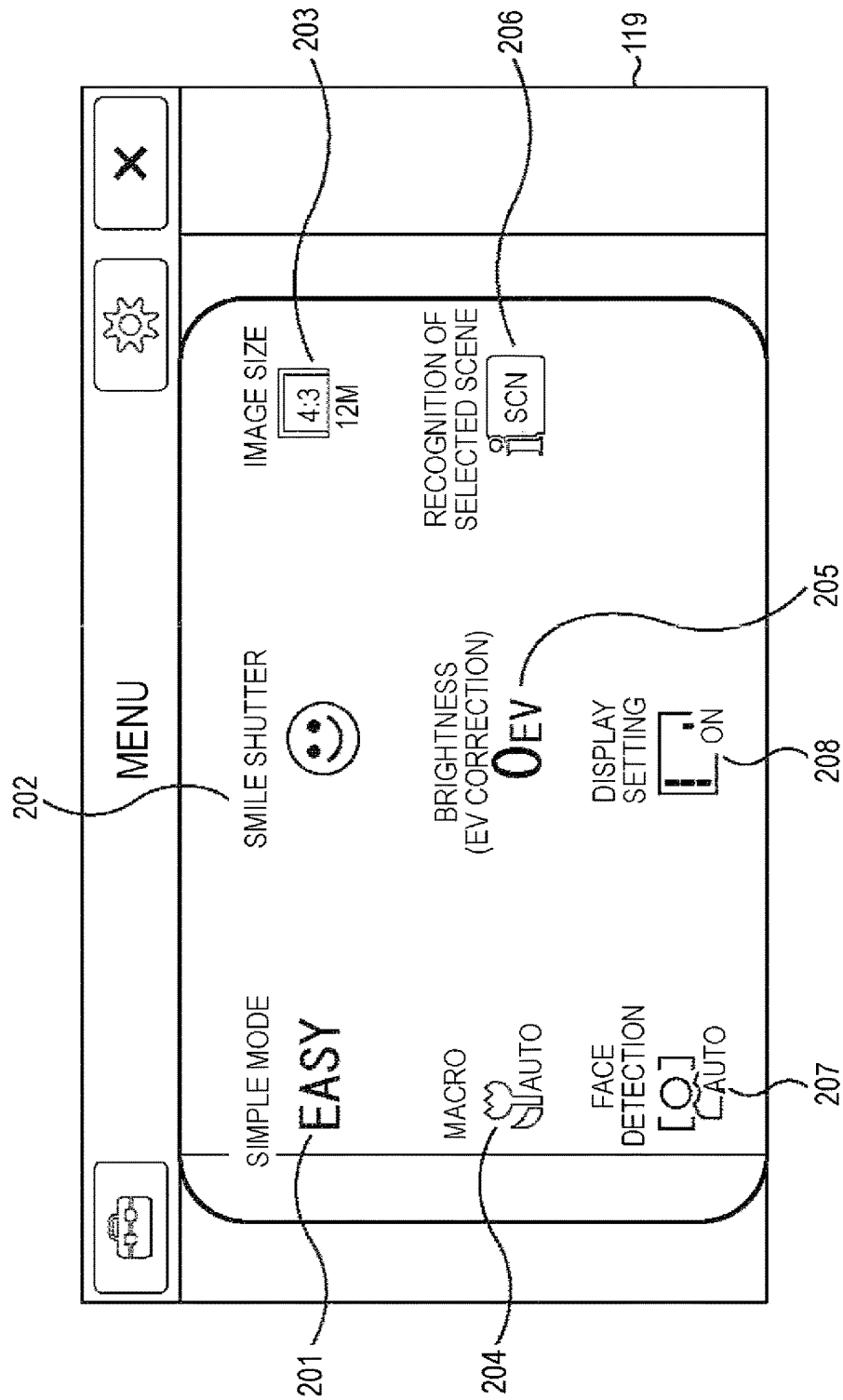
FIG. 8 is a diagram illustrating an example of an image displayed on a touchscreen.

FIG. 8 shows an example of an image displayed on the touchscreen 119. FIG. 8 is regarded as a menu screen displayed when, for example, a mode in which a menu screen is displayed is selected by the above-described mode dial 117 in the imaging apparatus 50.

In this menu screen, various icons are displayed. For example, an icon 201 that is displayed as a "simple mode", an icon 202 that is displayed as a "smile shutter", . . . , an icon 208 that is displayed as a "display setting" are displayed.

A user approaches to an icon displayed on the touchscreen 119 using a finger and may select a desired icon. When the icon is selected, a function corresponding to the icon is executed or a predetermined setting is performed.

For example, when user approaches an icon 207 using a finger, the icon is selected and a function of "face detection" is executed. Here, "face detection" is a function of automatically detecting a face of human beings in a subject that is photographed as an image corresponding to an image signal output from the CCD 131, and of performing an auto-focusing to further bring the detected face into focus.

With reference to FIGS. 9A to 11B, description will be made with respect to a transition of a display screen of the touchscreen 119 in a case where the icon 207 is selected by a user.

Figure 9A:
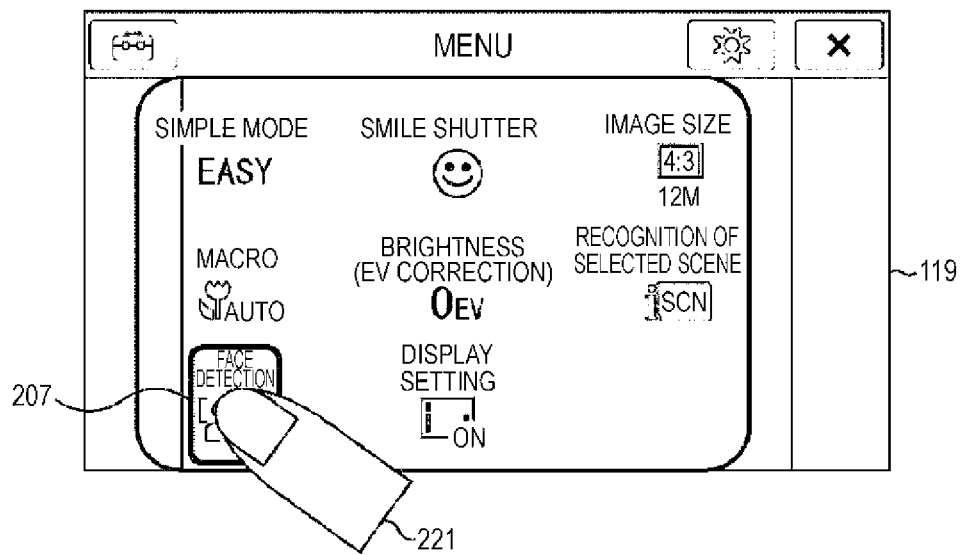
FIGS. 9A and 9B are diagrams illustrating a transition in a display screen of the touchscreen in a case where an icon is selected.

FIG. 9A shows a diagram illustrating an example of an image obtained when the touchscreen 119 is observed with the user's eyes.

As shown in FIG. 9A, a user approaches to a portion, on which the icon 207 is displayed, of the touchscreen 119 by using a finger 221. At this time, it is assumed that the finger 221 does not sufficiently approach to the touchscreen 119. For example, it is assumed that the distance between the finger 221 and the touchscreen 119 is equal to or larger than a threshold value Th1.

Figure 9B:
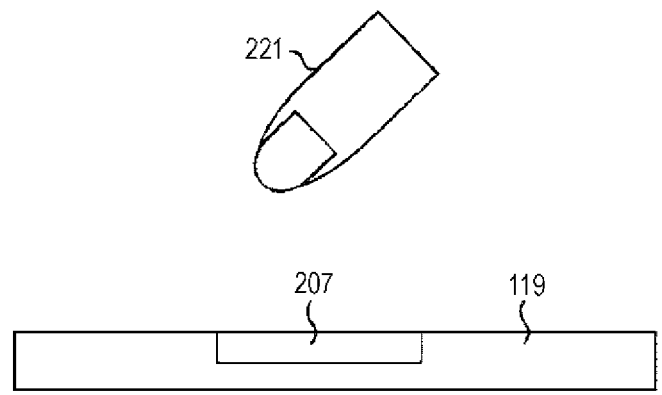

FIG. 9B shows a diagram that is obtained when the user views the touchscreen 119 from a left side direction of FIG. 9A, and that illustrates a virtual sense of the distance between the icon 207 of the touchscreen 119 and the finger 221, which the user perceives as a result of observing the touchscreen 119. In addition, FIG. 9B illustrates a sense of perspective which the user perceives from a 3D image, while actually, the icon 207 is just an image that is displayed on a surface of the touchscreen 119 (that is, a planar article not having thickness and depth).

As shown in FIG. 9B, the icon 207 does not protrude from the touchscreen 119. That is, the distance between the finger 221 and the touchscreen 119 is equal to or larger than a threshold value Th1, such that an image having parallax is not generated, and the icon 207 seen from a user appears to be located on a surface of the touchscreen 119.

Figure 10A:
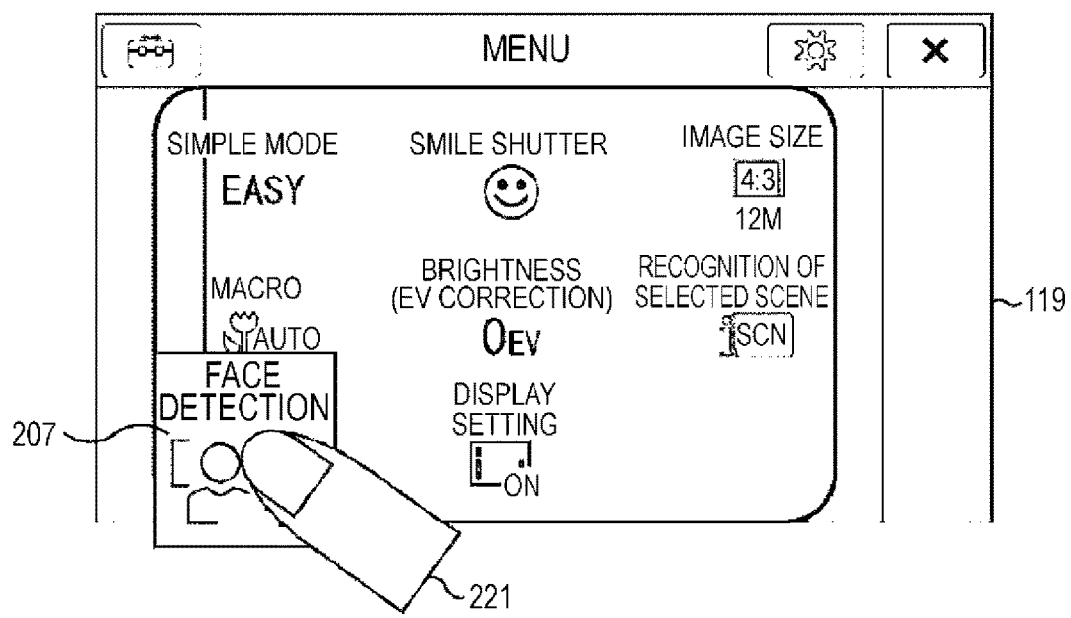
FIGS. 10A and 10B are diagrams illustrating the transition in the display screen of the touchscreen in a case where the icon is selected.

FIG. 10A illustrates another example of an image obtained when the touchscreen 119 is observed with the user's eyes. As shown in FIG. 10A, a user further approaches to a portion, on which the icon 207 is displayed, of the touchscreen 119 by using a finger 221. At this time, for example, it is assumed that the distance between the finger 221 and the touchscreen 119 is less than the threshold value Th1 and is equal to or larger than a threshold value Th2.

Figure 10B:
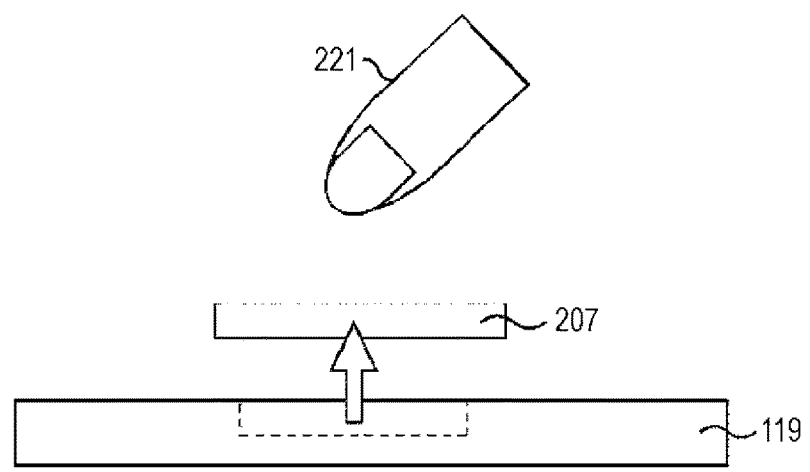

FIG. 10B shows a diagram that is obtained when the touchscreen 119 is seen from a left side direction of FIG. 10A, and that illustrates a virtual sense of the distance between the icon 207 of the touchscreen 119 and the finger 221, which the user perceives as a result of observing the touchscreen 119. In addition, FIG. 10B illustrates a sense of perspective which the user perceives from a 3D image, while actually, the icon 207 is just an image that is displayed on a surface of the touchscreen 119 (that is, a planar article not having thickness and depth).

As shown in FIG. 10B, the icon 207 protrudes from the touchscreen 119, and becomes close to the finger 221. That is, the distance between the finger 221 and the touchscreen 119 is less than the threshold value Th1, such that an image having parallax is generated, and the icon 207 seen from a user.

Figure 11A:
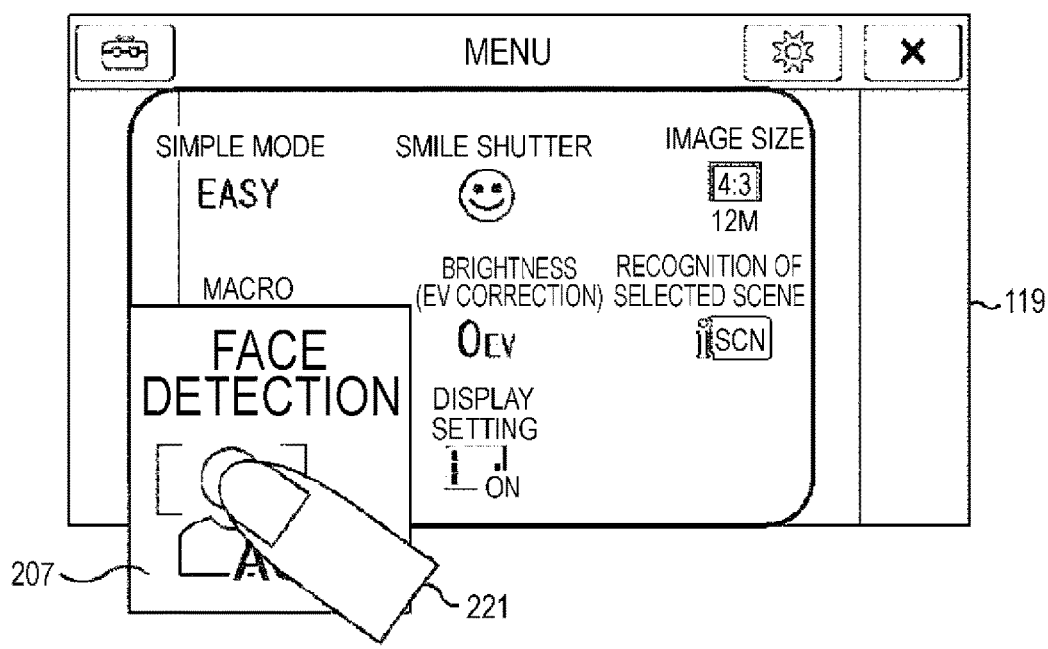
FIGS. 11A and 11B are diagrams illustrating the transition in the display screen of the touchscreen in a case where the icon is selected.

FIG. 11A illustrates still another example of an image obtained when the touchscreen 119 is observed with the user's eyes. As shown in FIG. 11A, a user further approaches to a portion, on which the icon 207 is displayed, of the touchscreen 119 by using a finger 221. At this time, for example, it is assumed that a distance between the finger 221 and the touchscreen 119 is less than the threshold value Th2.

Figure 11B:
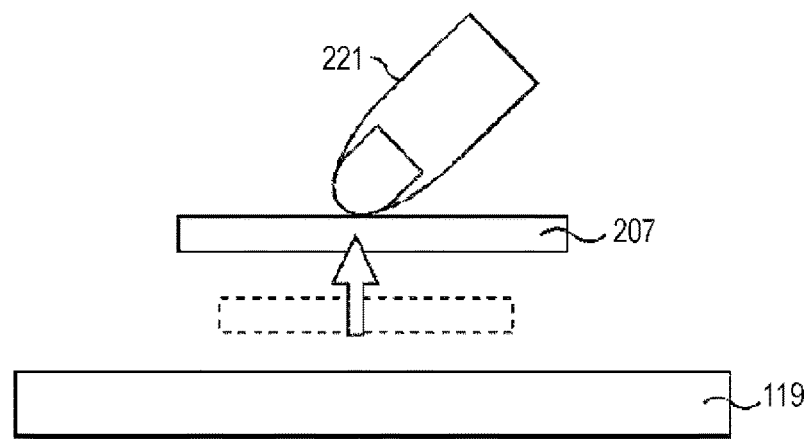

FIG. 11B shows a diagram that is obtained when the touchscreen 119 is seen from a left side direction of FIG. 11A, and that illustrates a virtual sense of the distance between the icon 207 of the touchscreen 119 and the finger 221, which the user perceives as a result of observing the touchscreen 119. In addition, FIG. 11B illustrates a sense of perspective which the user perceives by a 3D image, while actually, the icon 207 is just an image that is displayed on a surface of the touchscreen 119 (that is, a planar article not having thickness and depth).

As shown in FIG. 11B, the icon 207 protrudes from the touchscreen 119, and comes into contact with the finger 221. That is, the distance between the finger 221 and the touchscreen 119 is less than the threshold value Th2, such that an image having a further large parallax is generated, and the icon 207 seen from a user looks as if it further protrudes from the touchscreen 119.

In addition, the icon 207 shown in FIG. 10A and FIG. 11A may be enlarged and displayed. That is, when seen to the side of the user, the icon 207 may be made to look as if it protrudes from the touchscreen 119 and at the same time as if the icon 207 is enlarged compared to other icons. In this manner, it is possible to allow the user to clearly come to feel the selection of the icon 207.

When it reaches the state shown in FIGS. 11A and 11B, a function allocated to the icon 207 is executed. That is, a function (face detection) of automatically detecting a face of human beings in a subject that is photographed as an image corresponding to an image signal output from the CCD 131, and of performing an auto-focusing to bring the detected face into focus is performed.

In addition, when a function allocated to the icon 207 is executed, for example, the color of the icon 207 may be changed. In addition, when a function allocated to the icon 207 is executed, for example, the icon 207 may be animation-displayed to gradually disappear (fade-out). In this manner, the user may clearly come to feel the selection of the icon 207. In addition, in this manner, it is possible to feed back the selection operation of the icon to the user, such that it is possible to allow the user to clearly come to feel the selection of the icon 207.

In addition, when the menu screen is displayed three-dimensionally, or when the function of the icon is executed, a predetermined sound effect or the like may be output.

Next, an example of an icon selection and display controlling process performed by the imaging apparatus 50 will be described with reference to a flowchart of FIG. 12. This process is performed, for example, when the imaging apparatus 50 receives a user's operation through the touchscreen 119.

In step S21, the CPU 136 controls the digital signal processing unit 134 and displays the menu screen on the liquid crystal panel 120 (the touchscreen 119).

In this manner, for example, the menu screen described above with reference to FIG. 8 is displayed.

In step S22, the approach determining unit 181 determines whether or not the approach of the user's finger 221 is detected, and when it is determined that the finger 221 has not approached yet, the process returns to step S21. For example, in the case of the state shown in FIGS. 9A and 9B, it is determined that the user's finger 221 has not yet approached.

In a case where it is determined that the approach of the user's finger 221 is detected in step S22, the process proceeds to step S23. For example, in the case of the state shown in FIGS. 10A and 10B, it is determined that the approach of the user's finger 221 is detected. For example, in a case where the distance between the finger 221 and the touchscreen 119 is less than a threshold value Th1, it is determined that the approach of the user's finger 221 is detected.

In step S23, the parallax adjusting unit 182 specifies an icon that is to be displayed three-dimensionally. At this time, for example, the icon that is to be displayed three-dimensionally is specified based on information that is included in data output from the approach determining unit 181 and that indicates that the user's finger 221 approaches which portion of the touchscreen 119. In addition, for example, a reference point P is set to the central position of the icon that is to be displayed three-dimensionally.

In step S24, the parallax adjusting unit 182 specifies a distance between the touchscreen 119 and the finger 221. The distance between the touchscreen 119 and the finger 221 is specified based on, for example, a degree of approach, which is obtained based on data output from the approach determining unit 181.

In step S25, the parallax adjusting unit 182 sets parallax of the 3D image generated by the 3D image generating unit 183. At this time, for example, parallax corresponding to the distance specified in step S24 is set. For example, in a case where it is specified that the user's finger approaches to a distance less than a first threshold value, parallax d1 is set, and in a case where it is specified that the user's finger approaches to a distance less than a second threshold value smaller than the first threshold value, parallax d2 larger than parallax d1 is set.

In step S26, the 3D image generating unit 183 generates data as left eye image data and right eye image data based on the parallax set in the process in step S25 and the reference point set according to the process in step S23. In this manner, the 3D image data is generated. In addition, based on this 3D image data, the menu screen of the touchscreen 119 is displayed three-dimensionally.

In step S27, the parallax adjusting unit 182 determines whether or not the distance between the touchscreen 119 and the finger 221 varies, and in a case where it is determined that the distance between the touchscreen 119 and the finger 221 does not vary, the process returns to step S26.

In step S27, in a case where it is determined that the distance between the touchscreen 119 and the finger 221 varies, the process proceeds to step S28.

In step S28, the parallax adjusting unit 182 determines whether or not the distance between the touchscreen 119 and the finger 221 is sufficiently small. For example, in a case where the distance between the touchscreen 119 and the finger 221 is less than a threshold value Th2, in step S28, it is determined that the distance between the touchscreen 119 and the finger 221 is sufficiently small.

In step S28, in a case where it is determined that the distance between the touchscreen 119 and the finger 221 is not sufficiently small, the process returns to step S22. On the other hand, in step S28, in a case where the distance between the touchscreen 119 and the finger 221 is sufficiently small, the process proceeds to step S29.

For example, in the case of the state shown in FIGS. 11A and 11B, in step S28, it is determined that the distance between the touchscreen 119 and the finger 221 is sufficiently small. For example, in a case where the distance between the touchscreen 119 and the finger 221 is less than the threshold value Th2, it is determined that the distance from the user's finger 221 is sufficiently small.

In step S29, the parallax adjusting unit 182 sets relatively large parallax as parallax of the 3D image generated by the 3D image generating unit 183.

In step S30, the 3D image generating unit 183 generates data as left eye image data and right eye image data in correspondence with the parallax set in the process of step S29. In this manner, the 3D image data is generated and therefore the menu screen of the touchscreen 119 is displayed three-dimensionally.

In step S31, the selection execution instructing unit 184 determines the selection of the icon specified in the process of step S23.

In step S32, the selection execution instructing unit 184 allows a function of the icon whose selection is determined in step S31 to be executed. At this time, for example, as shown in FIGS. 11A and 11B, the icon 207 is selected, and a function (face detection) of automatically detecting a face of human beings in a subject that is photographed as an image corresponding to an image signal output from the CCD 131, and of performing an auto-focusing to bring the detected face into focus is performed.

In this manner, an icon selection and display controlling process is performed. In this way, for example, as described above with reference to FIG. 9A to FIG. 11B, when the user's finger 221 approaches to the icon 207, it looks as if the icon 207 protrudes from the touchscreen 119. In addition, when the user's finger 221 further approaches to the icon 207, it looks as if the icon 207 further protrudes from the touchscreen 119 and comes into contact with the finger 221.

Therefore, without touching the screen 119 by the finger 221, it is possible to allow the user to clearly come to feel the selection of the icon 207 and the fact that the function of the icon is executed.

In addition, in the above-described example, an example where when the finger approaches, the icon is displayed to look as if it protrudes from the touchscreen, but the icon may be displayed in other ways. For example, the display may be performed in such a manner that an icon, which looks as if it sinks in the depth direction of the touchscreen, looks as if it rises up when the finger approaches to the icon. The point is that the display data may be generated such that when the finger approaches to the icon, the icon looks as if it closes to the finger.

However, in the example described above with reference to FIG. 12, for example, in a case where the distance between the touchscreen 119 and the finger 221 is less than the threshold value Th1, the approach is detected, and in a case where the distance is less than the threshold value Th2, the selection of the icon is determined. That is, the determination of the distance between the touchscreen 119 and the finger 221 is performed in two steps.

However, the determination of the distance between the touchscreen 119 and the finger 221 may be performed in three steps or more. In this way, a realistic 3D display may be performed.

In addition, the determination of the distance between the touchscreen 119 and the finger 221 may be performed using a single threshold value. In this case, the icon selection and display control may be relatively simple.

FIG. 13 shows a flowchart illustrating another example of the icon selection and display controlling process by the imaging apparatus 50. This process is a process which becomes simpler than the icon selection and display controlling process of FIG. 12.

In step S51, the CPU 136 controls the digital signal processing unit 134 to display the menu screen on the liquid crystal panel 120 (the touchscreen 119).

In step S52, the approach determining unit 181 determines whether the approach of the user's finger 221 is detected, and when it is determined that the finger 221 has not yet approached, the process returns to step S51. For example, in the case of the state shown in FIGS. 9A and 9B, it is determined that the user's finger 221 has not yet approached.

In a case where it is determined that the approach of the user's finger 221 is detected in step S52, the process proceeds to step S53. For example, in a case where the distance between the touchscreen 119 and the finger 221 is less than the threshold value Th1, it is determined that the approach of the user's finger 221 is detected.

In step S53, the parallax adjusting unit 182 specifies an icon that is to be displayed three-dimensionally. At this time, for example, the icon that is to be displayed three-dimensionally is specified based on information that is included in data output from the approach determining unit 181 and that indicates that the user's finger 221 approaches which portion of the touchscreen 119. In addition, for example, a reference point P is set to the central position of the icon that is to be displayed three-dimensionally.

In step S54, the parallax adjusting unit 182 sets parallax of the 3D image generated by the 3D image generating unit 183. At this time, for example, parallax that is determined in advance is set.

In step S55, the 3D image generating unit 183 generates data as left eye image data and right eye image data based on the parallax set in the process in step S54 and the reference point set according to the process in step S53. In this manner, the 3D image data is generated. In addition, based on this 3D image data, the menu screen of the touchscreen 119 is displayed three-dimensionally.

In step S56, the selection execution instructing unit 184 determines the selection of the icon specified in the process of step S53.

In step S57, the selection execution instructing unit 184 allows a function of the icon whose selection is determined in step S31 to be executed. At this time, for example, as shown in FIGS. 11A and 11B, the icon 207 is selected, and a function (face detection) of automatically detecting a face of human beings in a subject that is photographed as an image corresponding to an image signal output from the CCD 131, and of performing an auto-focusing to bring the detected face into focus is performed.

In this manner, the icon selection and display controlling process may be performed.

Hereinbefore, an example where the present technology is applied to the imaging apparatus 50 is described, but the present technology may be applied to other electronic apparatuses other than the imaging apparatus. The present technology may be applied an arbitrary apparatus as long as an operation using a touchscreen or the like is performed.

In addition, hereinbefore, an example where the icon or the like displayed on the touchscreen is operated by using a finger or the like is described, but for example, the present technology may be applied to a case where the icon or the like displayed on the touchscreen is operated by using a stylus pen or the like.

In addition, hereinbefore, an example where the 3D display is performed when the icon in the menu screen displayed on the touchscreen is selected is described, but the application of the present technology is not limited thereto. The point is that the present technology may be applied as long as a GUI part is displayed on the touchscreen or the like, and this GUI part is operated.

In addition, hereinbefore, an example where the 3D display is performed by the touchscreen having the 3D display in which the parallax barrier system is adopted is described, but the present disclosure may be applied even in a case where the 3D display is performed using a system other than the parallax barrier system. For example, a touchscreen having a 3D display in which a lenticular system is adopted may be used.

In addition, a touchscreen having a 3D display that allows a user to observe it wearing special eyeglasses other than the 3D display that allows the user to observe it with the naked eye may be used.

In addition, the above-described serial processes may be executed by hardware or software. In a case where the above-described series of processes is executed by the software, a program making up the software may be installed, over a network or from a recording medium, on a computer in which dedicated hardware is assembled, or for example, a general purpose personal computer 700 shown in FIG. 14, which can execute various functions by installing various programs.

Figure 14:
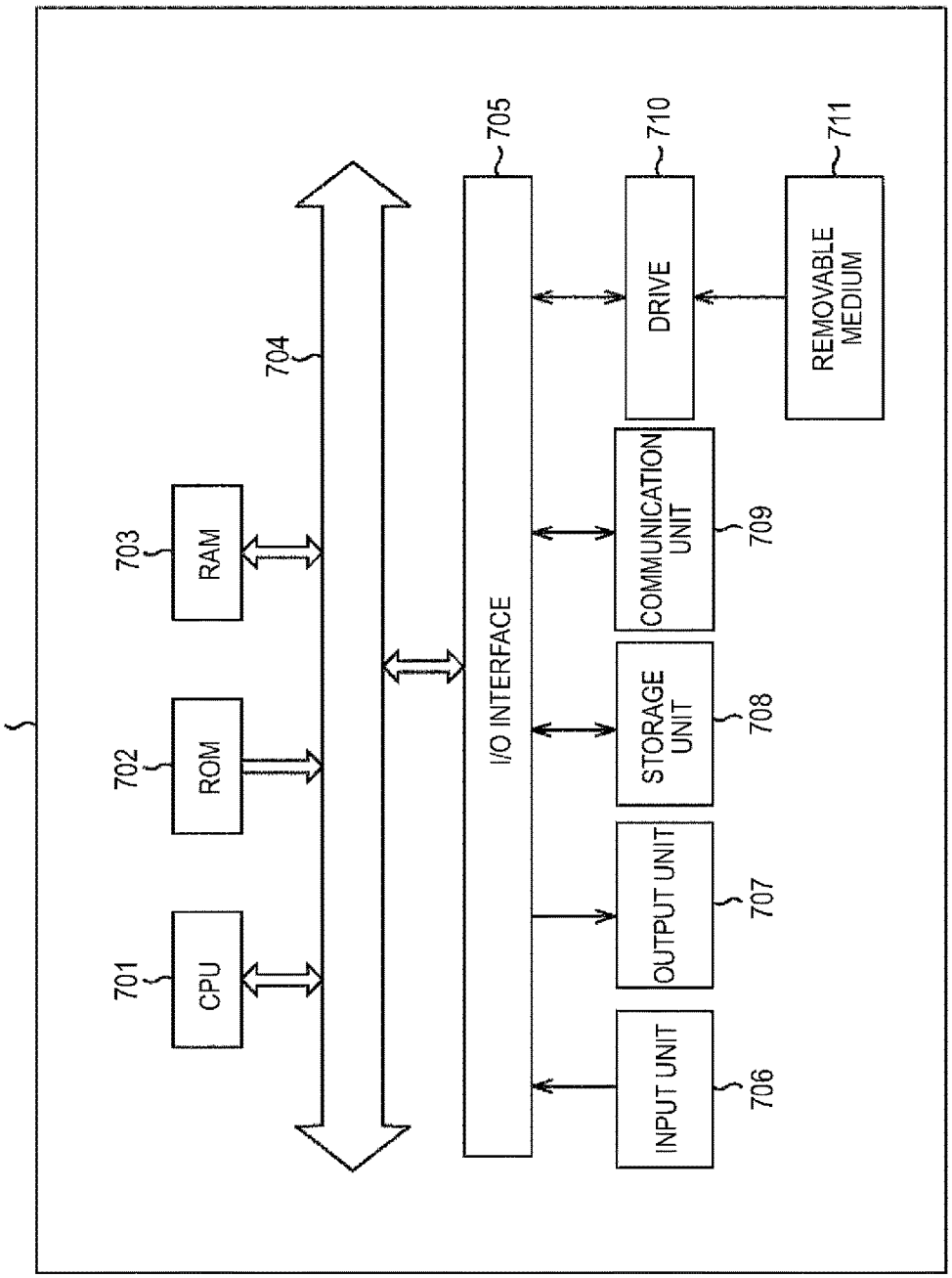
FIG. 14 is a block diagram illustrating a configuration example of a personal computer.

In FIG. 14, a CPU (Central Processing Unit) 701 performs various processes according to a program that is stored in a ROM (Read Only Memory) 702, or a program that is loaded into a RAM (Random Access Memory) 703 from a storage unit 708. In the RAM 703, data necessary for executing various processes by the CPU 701 is appropriately stored.

The CPU 701, the ROM 702, and the RAM 703 are connected to each other through a bus 704. In addition, an I/O interface 705 is connected to the bus 704.

To the I/O interface 705, an input unit 706 such as a keyboard and a mouse, a display such as an LCD (Liquid Crystal Display), an output unit 707 such as a speaker, a storage unit 708 such as a hard disk, and a communication unit 709 such as a modem and a network interface card including a LAN card or the like are connected. The communication unit 709 performed a communication process over a network including the Internet.

A drive 710 is connected to the I/O interface 705 as necessary, and a removable medium 711 such as a magnetic disk, an optical disc, a magneto-optical disc, and a semiconductor memory is appropriately mounted, and therefore a computer program read out from these may be installed in the storage unit 708 as necessary.

In the case of executing the above-described serial processes by software, a program making up the software may be installed over a network such as the Internet, or a recording medium such as the removable medium 711.

In addition, separately from a main body of the apparatus shown in FIG. 14, this recording medium may be composed of not only the removable medium 711 including a magnetic disk (including a floppy disk (registered trademark)), an optical disc (including CD-ROM (Compact Disc-Read Only Memory), and a DVD (Digital Versatile Disc)), an magneto-optical disc (including MD (Mini-Disc)(registered trade mark)), a semiconductor memory, or the like, which is distributed for transmitting a program to a user and on which the program is recorded, but also the ROM 702, a hard disk included in the storage unit 708, or the like, which is distributed to a user in a state of being assembled in advance to the main body of the apparatus and in which the program is recorded.

It should be noted that the present disclosure can also take the following configurations.

(1)

An image processing apparatus, including:

an approach detecting unit that detects whether or not an object, which operates a GUI part, approaches with respect to a display unit that displays the GUI part;

a part specifying unit that specifies the GUI part that is operated, in a case where the object approaches; and an image data generating unit that generates image data that controls a depth display of the display unit such that the specified GUI part looks to be close to the object.

(2)

The image processing apparatus according to [1], wherein the image data generating unit generates the image data, which controls the depth display of the display unit, according to a degree to which the object approaches with respect to the display unit.

(3)

The image processing apparatus according to [2], wherein the degree of approach is compared to a threshold value set in advance, and parallax, which is used for the control of the depth display of the display unit, is set in correspondence with the comparison result.

(4)

The image processing apparatus according to [1], wherein the image data generating unit generates the image data such that the specified GUI part is enlarged and displayed.

(5)

The image processing apparatus according to [1], wherein the image data generating unit generates the image data such that a color of the specified GUI part is changed.

(6)

The image processing apparatus according to [1], further including:

a function executing unit that executes a function allocated to the specified GUI part, after the image data is generated by the image data generating unit.

(7)

The image processing apparatus according to [1], wherein the display includes a 3D display adopting a parallax barrier system.

(8)

The image processing apparatus according to [1], wherein the approach detecting unit includes a touchscreen.

(9)

The image processing apparatus according to [1], wherein the image data generating unit generates the image data by generating left eye image data and right eye image data that have a predetermined parallax based on a reference point corresponding to a display position of the GUI part.

(10)

A method of displaying an operation screen, including:

allowing an approach detecting unit to detect whether or not an object, which operates a GUI part, approaches with respect to a display unit that displays the GUI part by an approach detecting unit;

allowing a part specifying unit to specify the GUI part that is operated in a case where the object approaches, by a part specifying unit; and allowing an image data generating unit to generate image data that controls a depth display of the display unit such that the specified GUI part looks to be close to the object by an image data generating unit.

(11)

A program that allows a computer to function as an image processing apparatus, wherein the image processing apparatus includes:

an approach detecting unit that detects whether or not an object, which operates a GUI part, approaches with respect to a display unit that displays the GUI part;

a part specifying unit that specifies the GUI part that is operated in a case where the object approaches; and an image data generating unit that generates image data that controls a depth display of the display unit such that the specified GUI part looks to be close to the object. In addition, the above-described series of processes in the present specification includes not only processes performed in time series according to the described sequence, but also processes performed in parallel or separately even though not necessarily performed in time series.

In addition, an embodiment of the present disclosure is not limited to the above-described embodiments, and various changes may be made without departing from the scope of the present disclosure.

REFERENCE SIGNS LIST

50: Imaging apparatus
119: Touchscreen
120: Liquid crystal panel
121: Approach panel
134: Digital signal processing unit
136: CPU
137: Operation unit
138: EEPROM
139: Program ROM
140: RAM
181: Approach determining unit
182: Parallax adjusting unit
183: 3D image generating unit
184: Selection executing unit
201 to 208: Icons

The invention claimed is:

1. A control unit, comprising:
a control circuit configured to:
control a display device to display a graphical user interface (GUI) that includes at least one icon;
detect approach of an object towards the at least one icon;
change, based on the detection of the approach of the object that is within a first distance from a display region of the display device in which the at least one icon is displayed, a depth of the display of the at least one icon, such that the display of the at least one icon is protruded from the display region towards the object;
change a color of the at least one icon based on the detection of the approach of the object that is within a second distance from the display region; and
execute a function associated with the at least one icon based on the detection of the approach of the object that is within the second distance from the display region.

2. The control unit of claim 1, wherein the control circuit is further configured to change the depth of the display such that the depth of the display of the at least one icon is reduced.

3. The control unit of claim 1,
wherein the at least one icon is a user-selectable icon, and
wherein the control circuit is further configured to change the depth of the display of the at least one icon based on the detection of the approach of the object that is within the first distance from the at least one icon.

4. The control unit of claim 1,
wherein the control circuit is further configured to change the at least one icon from a first state to a second state based on the detection of the approach of the object that is within the first distance from the display region, and
wherein in the second state a first display depth of the at least one icon is different from a second display depth of the at least one icon in the first state.

5. The control unit of claim 1, further comprising a sensor configured to detect the object at one of the first distance or the second distance from the display region.

6. The control unit of claim 5, wherein the sensor is an electrostatic capacitance sensor.

7. The control unit of claim 1, wherein the display device is a 3-dimensional display device.

8. The control unit of claim 7, wherein the 3-dimensional display device is configured to display a left image and a right image.

9. The control unit of claim 1, wherein the control circuit is further configured to change a parallax of the at least one icon so as to create a visually perceptual change in the depth of the display of the at least one icon.

10. The control unit of claim 1, wherein the control circuit is further configured to: cause the at least one icon to gradually disappear based on the detection of the approach of the object that is within the second distance; and trigger the execution of the function associated with the at least one icon.

11. A method, comprising:
controlling a display device to display a graphical user interface (GUI) that includes at least one icon;
detecting approach of an object towards the at least one icon;
changing, based on the detection of the approach of the object that is within a first distance from a display region of the display device in which the at least one icon is displayed, a depth of the display of the at least one icon, such that the display of the at least one icon is protruded from the display region towards the object;
changing a color of the at least one icon based on the detection of the approach of the object that is within a second distance from the display region; and
executing a function associated with the at least one icon based on the detection of the approach of the object that is within the second distance from the display region.

12. The method of claim 11, further comprising changing the depth of the display by lessening the depth of the display of the at least one icon.

13. The method of claim 11,
wherein the icon is a user-selectable icon, and
wherein the controlling comprises changing the depth of the display of the at least one icon based on the detection of the approach of the object that is within the first distance from the at least one icon.

14. The method of claim 11, further comprising changing the at least one icon from a first state to a second state based on the detection of the approach of the object that is within the first distance from the display region, and
wherein in the second state, a first display depth of the at least one icon is different from a second display depth of the at least one icon in the first state.

15. The method of claim 11, further comprising detecting the object with a sensor at one of the first distance or the second distance from the display region.

16. A non-transitory computer-readable medium having stored thereon computer-readable instructions, which when executed by a computer, cause the computer to execute operations, the operations comprising:
controlling a display device to display a graphical user interface (GUI) that includes at least one icon;
detecting approach of an object towards the at least one icon;
changing, based on the detection of the approach of the object that is within a first distance from a display region of the display device in which the at least one icon is displayed, a depth of the display of the at least one icon such that the display of the at least one icon is protruded from the display region towards the object;
changing a color of the at least one icon based on the detection of the approach of the object that is within a second distance from the display region; and
executing a function associated with the at least one icon based on the detection of the approach of the object that is within the second distance from the display region.

17. The control unit of claim 1, wherein based on the change in the depth of the display of the at least one icon and a change in a distance of the object from the display region, the control circuit is further configured to execute the function.

18. The control unit of claim 1, wherein the control circuit is further configured to output a sound effect based on the execution of the function.

19. A control unit, comprising:
a control circuit configured to:
control a display device to display a graphical user interface (GUI) that includes at least one icon;
detect approach of an object towards the at least one icon;
change, based on the detection of the approach of the object that is within a first distance from a display region of the display device in which the at least one icon is displayed, a depth of the display of the at least one icon, such that the display of the at least one icon is protruded from the display region towards the object;
cause the at least one icon to gradually disappear in the display device, based on the detection of the approach of the object that is within a second distance;
execute a function associated with the at least one icon based on the detection of the approach of the object that is within the second distance from the display region; and
trigger the execution of the function associated with the at least one icon.

* * * * *